No. 876,106. PATENTED JAN. 7, 1908.
A. T. SPENCER & E. C. WYKES.
BOX MAKING MACHINE.
APPLICATION FILED FEB. 28, 1905.

5 SHEETS—SHEET 1.

Witnesses
J. M. Kuehne
John G. Percival

Inventors
Alfred T. Spencer
Ernest C. Wykes
By Richard
ATTORNEYS

No. 876,106. PATENTED JAN. 7, 1908.
A. T. SPENCER & E. C. WYKES.
BOX MAKING MACHINE.
APPLICATION FILED FEB. 28, 1905.

5 SHEETS—SHEET 2.

Witnesses
H. M. Kuehne
John A. Percival.

Inventors
Alfred T. Spencer
Ernest C. Wykes

By Richardson
Att'ys

No. 876,106. PATENTED JAN. 7, 1908.
A. T. SPENCER & E. C. WYKES.
BOX MAKING MACHINE.
APPLICATION FILED FEB. 28, 1905.
5 SHEETS—SHEET 3.
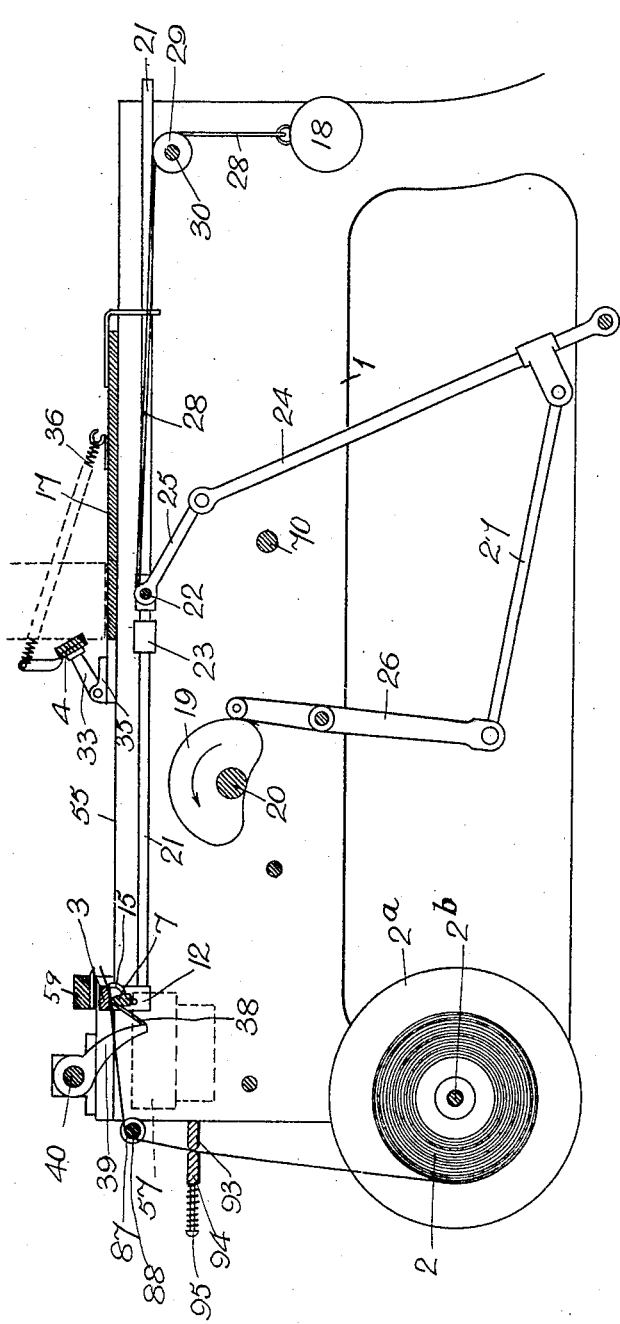
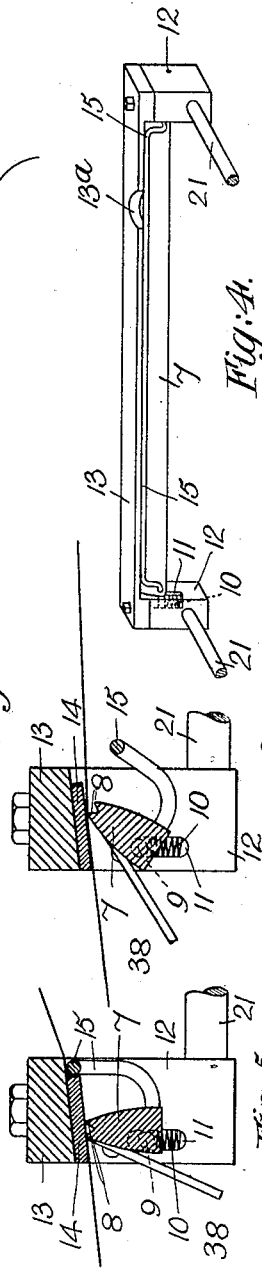
Witnesses
J.M. Kuehne
John A. Percival
Inventors
Alfred T. Spencer
Ernest C. Wykes
By Richard
ATTORNEYS No. 876,106. PATENTED JAN. 7, 1908.
A. T. SPENCER & E. C. WYKES.
BOX MAKING MACHINE.
APPLICATION FILED FEB. 28, 1905.

5 SHEETS—SHEET 4.

Witnesses
JM Kuchul
John A. Percival

Inventors
Alfred T. Spencer
Ernest C. Wykes

ATTORNEYS

No. 876,106. PATENTED JAN. 7, 1908.
A. T. SPENCER & E. C. WYKES.
BOX MAKING MACHINE.
APPLICATION FILED FEB. 28, 1905.
5 SHEETS—SHEET 5.
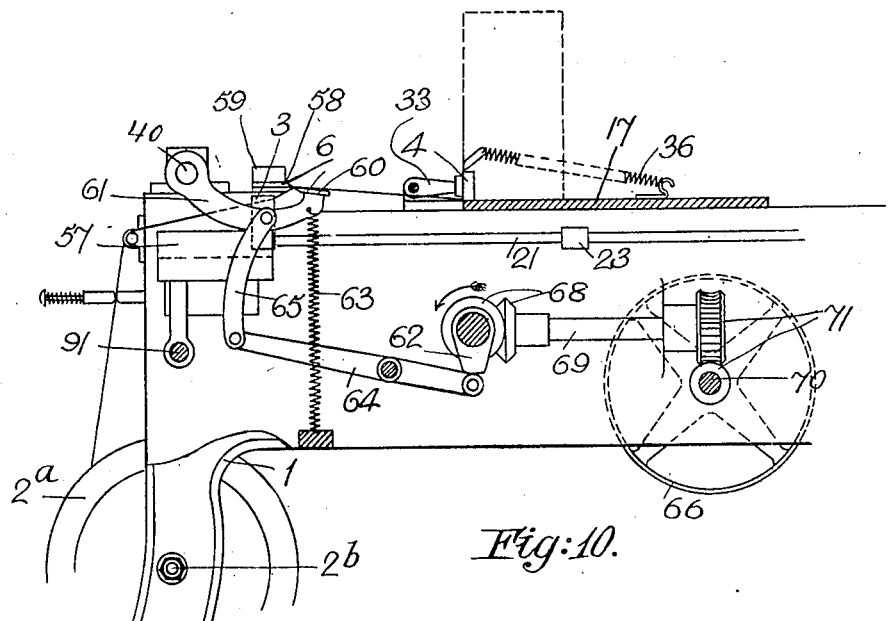
Fig: 10.
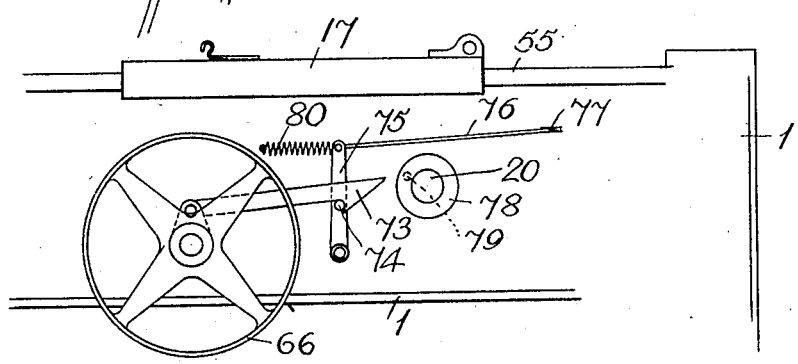
Fig: 11.
Witnesses
Inventors
Alfred T. Spencer
Ernest C. Wykes

UNITED STATES PATENT OFFICE.

ALFRED THORN SPENCER AND ERNEST CHARLES WYKES, OF LEICESTER, ENGLAND.

BOX-MAKING MACHINE.

No. 876,106.  Specification of Letters Patent.  Patented Jan. 7, 1908.

Application filed February 28, 1905. Serial No. 247,763.

*To all whom it may concern:*

Be it known that we, ALFRED THORN SPENCER and ERNEST CHARLES WYKES, both manufacturers, and both subjects of the King of Great Britain, citizens of Leicester, England, residing at upper Brown street, Leicester, in the county of Leicester, England, have invented certain new and useful Improvements in Box-Making Machines, of which the following is a specification.

This invention relates to machinery for making cardboard and like boxes, and has for its object to effect by mechanical means, the attachment of the loose sheet of paper, termed the "fly" to the inner upper edge of each side or end of a cardboard box.

A machine constructed in accordance with this invention is characterized by the following operations viz:—gluing the end of the paper, measuring and feeding it to the box, pressing the glued end on to the inner edge of the box, straining or stretching taut the fly before serving it, and finally cutting it off the end of the continuous length of paper.

This novel machine contains a device for gluing the end of a continuous length of paper, a feeder which grips the end of the paper and takes it to the box and while a presser bar presses the said end of the paper on to the box, the said feeder releases the paper and returns and again grips the paper at a point rearward of where it is severed to form the fly and glued to form the end of the next fly. This group of operations may be performed in the sequence described, or otherwise.

Figure 1:
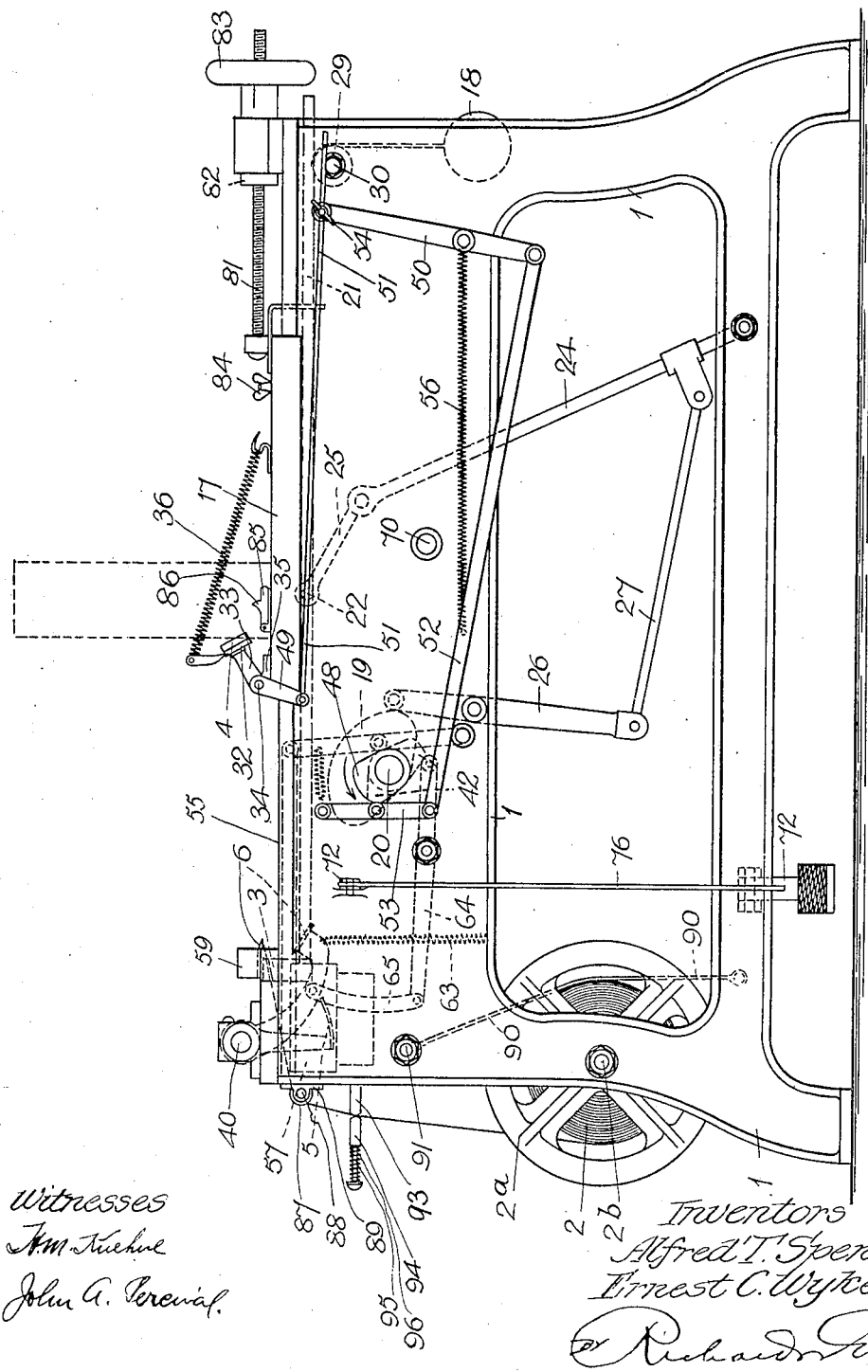
Figure 2:
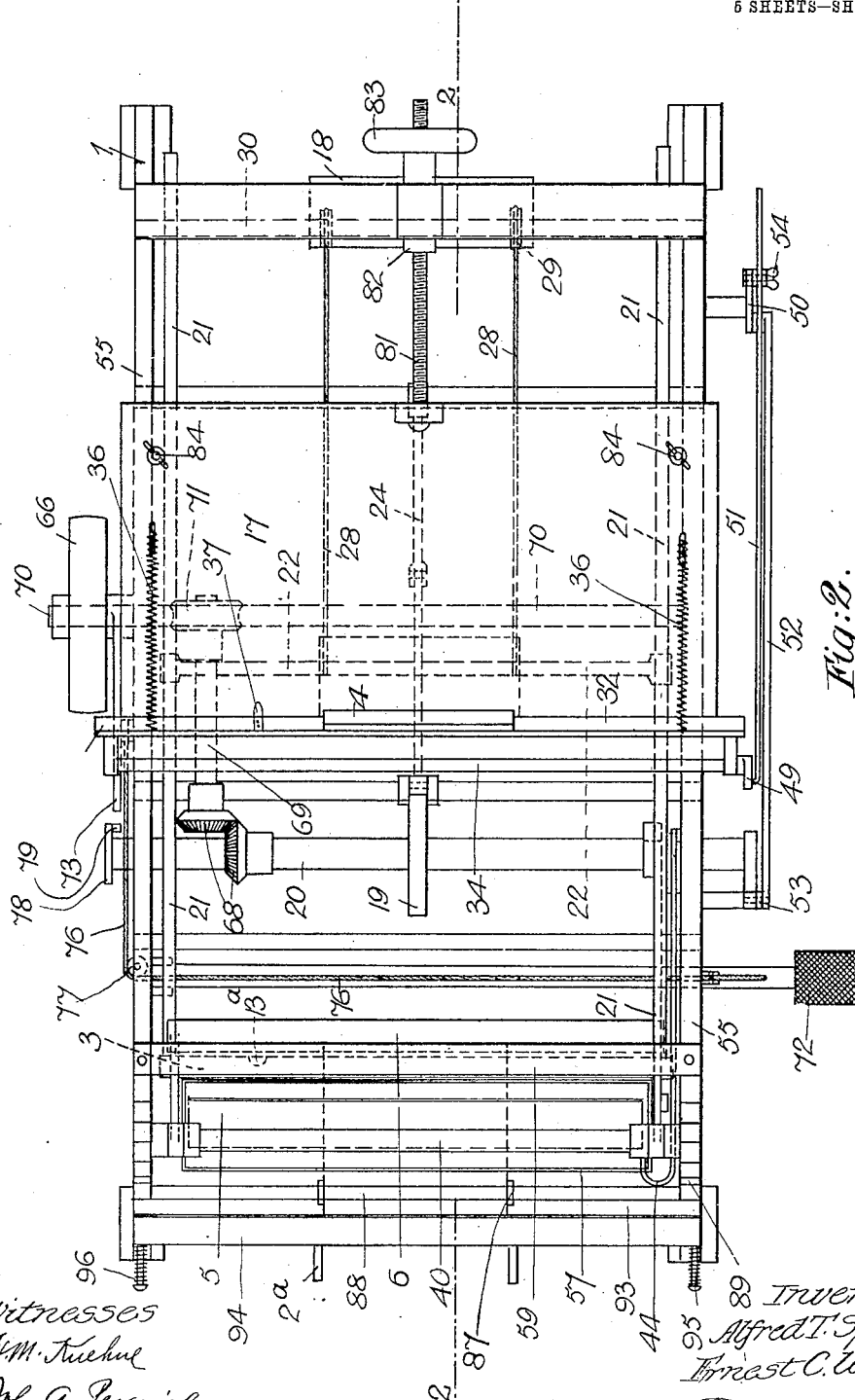
Figure 7:
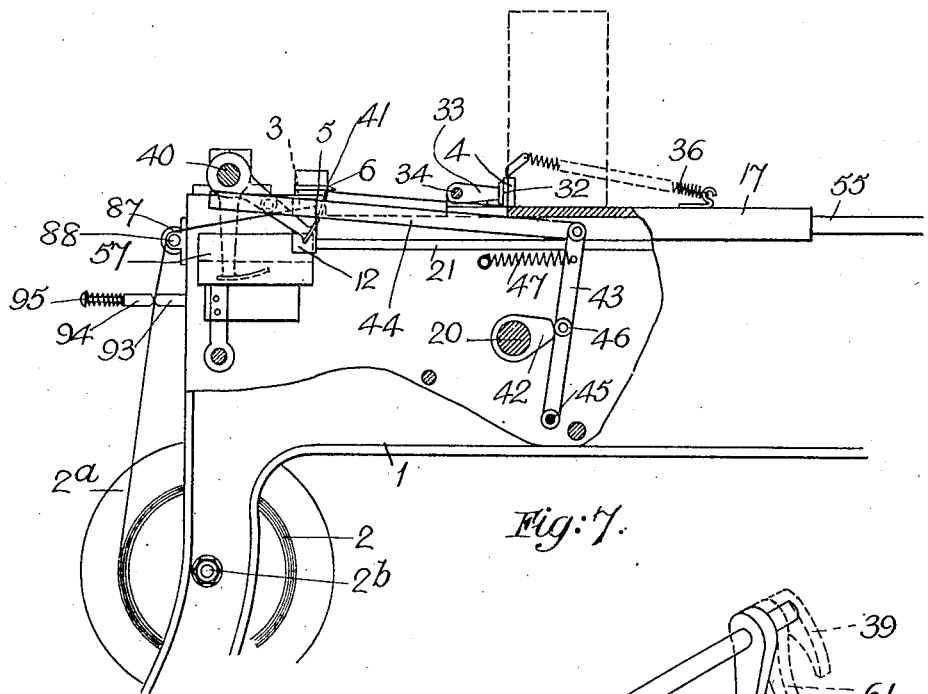
Figure 8:
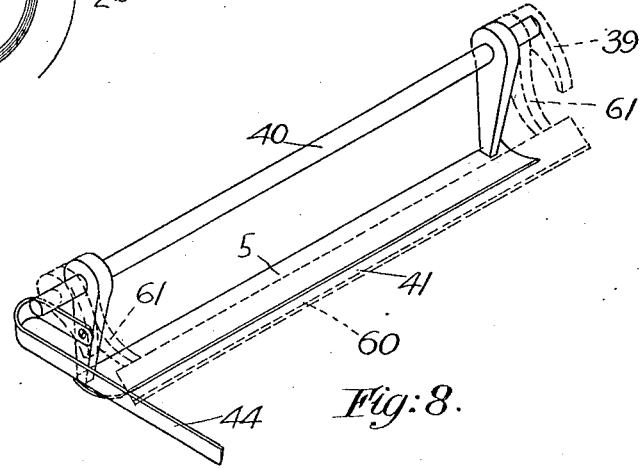
Figure 9:
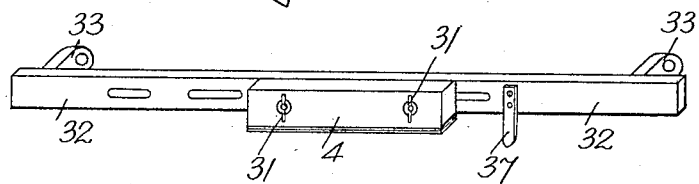

In the drawings, Figures 1 & 2., show side and plan views respectively of a complete box fly attaching machine constructed according to this invention. Fig. 3., is a vertical section on line 2, 2, Fig. 2, principally to illustrate the feeder and its actuating gear. Fig. 4., shows the feeder *per se* in perspective and Figs. 5 & 6., are cross sections of the feeder showing the same in its closed and open positions respectively. Fig. 7., shows the gluing device and its actuating gear. Fig. 8., shows the gluer bar in perspective. Fig. 9., is a back view of the presser bar *per se*. Fig. 10., illustrates the shears and its actuating gear, and Fig. 11., shows a side view of the mechanism for automatically throwing the driving clutch out of action.

Like parts are designated by the same reference numerals in all the figures.

Referring to the drawings, 1 represents the frame or body of the machine and 2 a roll of paper from which the flies are formed. The said roll is carried by a drum $2^a$ supported rotatably and adjustably on a spindle $2^b$ mounted in the said frame of the machine.

The free end of the paper strip passes through and is gripped by a feeder bar 3 whereby it is carried forward to the box support 17 and pressed on to the inner edge of the box placed thereon by a presser bar 4, having been already glued at the end of the previous cycle of operations. The presser bar remains in action pressing on the paper while the feeder bar, being now open, returns and tensions the paper while a gluing or pasting bar 5 coats the paper immediately behind the gripper and in front of a pair of shears 6 which next come into operation and sever the paper strip at a distance from the box determined by the width of fly required. The whole cycle of operations takes place during one complete revolution of a cam shaft 20 hereinafter referred to. The said feeder bar 3 comprises a rod 7 of approximately semi-oval form in cross section. The thin edge of the rod is fluted longitudinally to form two or more gripping edges 8 and when the feeder is closed the said rod assumes the position shown in Fig. 5. The rod is mounted on pivots or trunnions 9 which take a bearing on springs 10 located in slots 11 formed in blocks 12. The paper is gripped between the said fluted edges 8 and the underside of a transverse bar 13 bolted at each end to the aforesaid blocks 12. To accentuate the grip a rubber or felt pad 14 is secured to the underside of the bar 13 as shown. The shears 6 are arranged to sever the paper strip a short distance behind the feeder so that its free end projects a short distance therefrom and in order to keep this edge raised so as to clear the front of the box support or table 17, hereinafter referred to which carries the box, the under-surface of the bar 13 is inclined upward towards the support and a rod 15 is employed arranged parallel to and in front of the bar 13 and having its ends bent twice at right angles and brazed to the rod 7. When the feeder is closed the said rod 15 occupies the position indicated in the aforesaid Fig. 5 where it is shown gripping the paper in the angle formed between the two longitudinal edges of the bar 13 and the pad 14. The said feeder bar is carried by the forward end of a frame comprising two longitudinal members 21 joined by a transverse member 22. The said frame is adapted to reciprocate in a horizontal plane in the direction of its length in guides or sockets 23 carried by the framework of the machine and is secured by the front extremities of the longitudinal members 21 to the aforesaid blocks 12. The transitory motion of the feeder bar towards and from the support 17 on which the boxes are placed, is effected by means of a weight 18 and cam 19 respectively, Fig. 3. As the cam shaft 20 commences to revolve the cam 19 thereon through the medium of the levers 24, 26 and the connecting rods 25, 27 allows the weight 18, to move the longitudinal members 21 to bring the feeder up to the support 17. The said weight is secured to the said transverse member 22 by cords 28 passing over guide pulleys 29 rotatable on a transverse spindle 30 at the rear of the machine. The feeder makes contact with the front edge of the support & places the glued edge of the paper over the upper inner part of one edge of the box placed on the support whereupon the presser bar 4 descends and presses the said glued end of the paper on to the said edge of the box and holds it there during the whole of the remainder of the revolution of the cam shaft 20 aforesaid. The said presser bar 4, Fig. 9, is padded on its acting edge with soft material and is adjustably secured by thumbscrews 31 to a metal bar 32 arranged over the support transversely of the machine and carried at each end by arms 33 secured to a transverse spindle 34 rotatable in bearings 35 carried by the front edge of the support. The operation of the presser bar is controlled by springs 36 and a cam 48 mounted on the cam shaft 20 outside the frame 1 of the machine as clearly shown in Fig. 1. One end of the spindle 34 carries a crank 49 which is connected up to a lever 50 operated by the cam 48 by means of rods 51, 52 and a lever 53 pivoted to the frame. The rod 51 is adjustably secured to its end of the lever 53 by means of a thumbscrew 54 so as to allow for the adjustment of the support 17 on the bed 55 of the machine relatively to the shears 6 for varying widths of fly. The glued end of the paper strip being now in position over the edge of the box, the rotation of the cam 48 allows the springs 36 to lower the presser bar 4 to press the end of the paper on to the edge of the box and to hold it there until the paper has been severed by the shears and the cam shaft completed its revolution. The lever 50 is kept up against the cam by means of a spring 56 attached at one end to the rod 52 and at the other end to the frame of the machine.

The free end of the paper being now held secure by the presser bar the feeder is returned by the cam 19 and its connections aforesaid and as it leaves the edge of the support 17 a projection 37 on the bar 32 carrying the presser bar engages the rod 15 and opens the same and moves the rod 7 on its pivots 9 so that its fluted gripping edges 8 are just out of contact with the pad 14 as shown in Fig. 6. The bar 13 is cut away at 13ᵃ, Fig. 4, to accommodate the projection 37 and the motion of the rod 7 is assisted by the springs 10. The distance between the edges 8 of the rod 7 and the inclined undersurface of the pad 14 is such that the feeder in returning from the table pulls the paper taut without tearing it. As the feeder reaches the end of its return stroke a projection 38 on the rod 7 makes contact with a fixed stop 39 on the transverse gluer shaft 40 and moves the rods 7 & 15 to again grip the paper ready for its next movement to the support 17. The paper now stretching between the closed feeder bar and the presser bar is in more or less tension so that it may be glued the more readily by the gluer bar just behind the gripper and in front of the shears as shown in Fig. 7. Also by means of this tensioning or straining of the strip between the feeder and presser bar a uniform width of fly is assured for each adjustment of the support 17.

The gluer bar 5, Fig. 8, preferably comprises a longitudinal metal strip supported at each end by arms depending loosely from the gluer shaft 40. The said gluer bar 5 is of curved cross section the center of curvature being the axis of the shaft 40 from which it is suspended so that as the gluer bar 5 is swung upwards towards the paper strip in an arc of a circle about the shaft 40, any surplus glue may run back into the glue tank 57 the width of the strip 5 being such that its front edge never travels beyond the rear edge of the tank. The gluer normally hangs down submerged in the glue, as shown in dotted lines in Fig. 7, and as it is raised towards the paper its rear longitudinal edge 41, which applies the glue, makes more than a mere contact with the paper, i. e. it continues its upward motion a short distance after touching the paper and therefore has a slight rubbing motion on the strip with the result that a sufficiently broad layer of the glue is applied to the strip.

The motion of the gluer bar takes place in an arc of a circle having its center in the axis of the gluer shaft 40 and is in a plane parallel to the length of the paper strip. The gluer derives its motion from a cam 42 arranged on the cam shaft 20 in such a position that as the feeder approaches the end of its return motion the cam 42 commences to move the lever 43 and hence to raise the gluer bar which is connected thereto by the rod or bar 44 as shown in Fig. 7. The said lever 43 is pivoted at 45 to the frame of the machine and its cam roller 46 is kept in contact with the cam by means of the spring 47 which likewise effects the return or downward motion of the gluer.

As already stated the gluer makes contact with the tensioned strip between the feeder and shears 6, Fig. 7, so that when the shears sever the paper the edge of the strip projecting from the feeder is gummed and ready to be taken to the box by the feeder as aforesaid. The said shears 6, Fig. 10, comprise a fixed and a movable blade. The fixed blade 58 is carried by a transverse bar 59 bolted at each end to the frame 1 of the machine behind and parallel to the gluer shaft 40 and above the paper strip. The movable blade 60 is carried at each end by arms 61 depending loosely from the shaft 40 about which it is adapted to be moved in an arc of a circle to and from the fixed blade by means of a cam 62 and springs 63. The cam 62 is arranged to come into operation at or near the conclusion of each revolution of the cam shaft and to depress one end of a lever 64 pivoted to the frame the other end of which lever by means of a link 65 jointed to one of the arms 61 raises the movable blade 60 up to the fixed blade and severs the paper. The spiral spring or springs 63 normally hold the movable blade in its depressed out of action position and are connected at one end to the said blade and at the other to the frame of the machine.

The cam shaft 20 from which the various motions of the machine are derived is supported transversely of the machine and rotates in bearings carried by the latter. The said shaft is driven by miter wheels 68, Figs. 2 & 10, from a short shaft 69 which is itself driven from the main driving shaft 70 by means of worm and worm wheel gear 71 whereby the speed of the cam shaft rendered is considerably lower than that of the main shaft 70. The said main shaft carries a belt pulley 66 from which it is driven by means of a clutch which is adapted to be thrown into action by depressing a foot pedal 72 and releases itself automatically at the conclusion of each complete revolution of the cam shaft 20. The said clutch may be of any conventional type comprising two members having relative movement between them and adapted to be locked together so that the one may drive the other.

The movable portion of the clutch is provided with a latch 73, Fig. 11, pivoted thereto at one end and normally engaging a pin 74 on a lever 75 pivoted at one end to the frame of the machine and connected at the other by flexible connections 76 passing over guide pulleys 77 with the foot pedal 72 aforesaid. The adjacent extremity of the cam shaft is fitted with a disk 78 having a stud 79 projecting from its inner face and adapted as the cam shaft completes each revolution to raise the latch 73 free of the pin 74 whereupon the movable part of the clutch, which is preferably spring controlled, is thrown out of action and the machine stopped. A spring 80 attached to the framework at one end and to the upper end of the lever 75 at the other tends to hold the foot pedal raised and the said lever in a position to be engaged by the latch 73.

The operation of the machine is as follows:—A box having been placed in such a position on the support 17 that the presser bar 4 when it descends will make contact with the upper inner part of one edge of the box, the machine is started by depressing the foot lever 72. This movement of the foot lever is transmitted by the flexible connections 76 to the lever 75, Fig. 11, which in being moved forward engages and moves the latch 73 in the same direction thus throwing the clutch into action whereupon the cam shaft 20 commences to rotate in the direction of the arrow Fig. 1. As the shaft 20 rotates, the feeder cam 19 thereon, Fig. 3, allows the weight 18 attached to the frame 21, 22 carrying the feeder 3 which grips the paper strip, to pull the feeder backward up to the front edge of the support 17. In this position the free end of the paper strip, already glued is held by the feeder over the said upper inner part of one edge of the box and while in this position the presser bar cam 48 allows the springs 36 to pull down the presser bar 4 on to the edge of the paper and hold it there until the completion of the revolution of the cam shaft 20 as shown in Fig. 7. The end of the paper is now firmly held down by the presser bar 4 and as the feeder begins to return under the action of its cam 19 the projection 37 on the bar 32 engages the rod 15 and opens the feeder just sufficient to allow the latter to slacken its hold on the paper and to return without tearing the latter. The feeder on its return from the support tensions or strains the paper taut and when the said feeder has reached the limit of its return motion it is closed again to grip the paper by the projections 38, Fig. 3, on the rod 7, engaging the fixed stop 39 on the shaft 40. As the feeder approaches the end of its return motion the gluer cam 42 comes into action and by means of the lever 43 and rod 44 raises the gluer bar, 5, Fig. 7, out of the glue tank 57 into contact with the paper which is coated with glue thereby just immediately behind the feeder and in front of the shears 6. The return or downward motion of the gluer is effected by the spring 47 and as the said gluer returns to its tank the cam 62 comes next into action through the medium of the lever 64 and link 65, Fig. 10, raises the movable blade 60 of the shears up to the fixed blade 58 and severs the paper to form the fly. The presser bar is now raised by means of its cam 48 and adjustable connections 49, 50, 51, 52, 53, and at the same time the disk 78, Fig. 11, by means of its stud 79, raises the latch 73 and allows the spring 80 to throw the clutch out of action whereupon the machine is brought to rest with the parts in the same positions as before, namely, as shown in Figs. 1 and 2.

In order to provide for varying widths of fly the table 17, upon which the boxes are placed during the time they are being furnished with flies, is adjustable along the bed 55 of the machine relatively to the shears. To allow of this adjustment of the table, the rod 51, forming part of the presser bar actuating mechanism, is as already stated secured adjustably to the lever 50 by means of a thumbscrew 54 as shown in Figs. 1 and 2, The adjustment of the table is effected by means of a threaded rod 81 attached at one end to the said table 17 and passing rearward through a nut 82 carried by the frame of the machine and adapted to be rotated by means of a handwheel 83. The said table is locked in its adjusted position by clamping bolts and thumb nuts 84. It will be seen that by employing a weight 18 to move the feeder towards the support the traverse of the feeder automatically accommodates itself to the position of the support 17 as the latter itself limits the forward or feeding motion of the feeder.

The presser bar 4 when desired may be locked in its raised position by means of a locking piece 85 pivoted to the support and provided with a projection 86 adapted to engage the lower edge of the bar 32, as shown in Fig. 1.

The paper strip before passing to the feeder is guided between collars 87 fixed adjustably on a horizontal roller shaft 88 running transversely across the front of the machine in bearings 89 carried by the latter.

To prevent the paper coming too freely from its roll 2 a braking or friction arrangement is provided comprising a strap or straps 90, Fig 1, depending from the transverse stay 91 which supports the glue tank, behind the roll 2 being weighted at its lower end so as to exert a certain amount of friction on the roll. It will be seen that the straps automatically adjust themselves to the roll as the latter decreases in diameter.

The paper strip as it leaves the roll passes between two bars 93, 94. The bar 94 is movable on pins 95 relatively to the fixed bar 93, such movement being controlled by springs 96 the object being to prevent the paper being fed too freely to the feeder 3.

It should be understood that the word glue hereinbefore mentioned has been used in the sense that it includes all kinds of adhesive and also that the sequence of the operations may be varied.

What we claim then is:—

1. A box fly attaching machine comprising a reciprocating feeder for carrying the paper to the box, consisting of fixed and movable members, a support for the boxes, means for gluing the paper, a presser bar for pressing the glued end of the paper on to the box, said bar being provided with means for engaging the said movable member and opening the feeder as the latter returns from the support for the purposes described.

2. A box fly attaching machine comprising a reciprocating feeder for the paper, consisting of a fixed bar arranged transversely of the strip and having an inclined gripping surface, a rod mounted parallel and in proximity thereto on spring supported trunnions and provided with an auxiliary gripping rod for raising the free edge of the paper strip, and means for operating said rod for the purpose described.

3. A box fly attaching machine comprising in combination a reciprocating feeder for the paper consisting of a fixed bar and a movable rod and means to oscillate said rod relatively to the bar, a support for the boxes, a presser bar pivoted on the support for pressing the glued end of the paper on to the inside edge of the box, a shaft, and mechanism controlled thereby for raising and lowering the said presser bar relatively to the box, at the proper times.

4. A box fly attaching machine comprising a frame, a driving shaft, a cam shaft driven therefrom by worm and bevel gear, a clutch on the driving shaft, a foot pedal for throwing said clutch into action, a disk on the cam shaft, a projection on said disk for throwing the clutch out of action at the end of each revolution of the cam shaft, a drum carrying a continuous roll of paper, a support for the box, means for feeding the paper to the box, a device for pressing the glued end of the paper on to the box, a glue tank, means for applying the glue to the paper, shears comprising a fixed and movable blade arranged transversely of the paper and means for operating said movable blade to sever the paper to form the fly.

5. A box fly attaching machine comprising a frame, a drum carrying a roll of paper, friction straps to prevent the paper coming too freely off the drum, a roller shaft, collars adjustable thereon for guiding the paper, a support for the box adjustable on the frame relatively to a pair of shears, a feeder for gripping and carrying the paper to the said support, means on the feeder for raising the end of the paper to avoid contact with the edge of the support, grippers for controlling the supply of paper on to the edge of the box, means for locking the said bar in its inoperative position, a device for gluing the paper, and shears for cutting the paper, said feeding, pressing gluing and cutting operations being operated by and during one revolution of a cam shaft.

In witness whereof we have hereunto set our hands in presence of two witnesses.

ALFRED THORN SPENCER.
ERNEST CHARLES WYKES.

Witnesses:
 GEORGE LESTER,
 E. W. LEWIS.